US008509956B2

United States Patent
Jensen

(10) Patent No.: US 8,509,956 B2
(45) Date of Patent: Aug. 13, 2013

(54) WIND TURBINE CONFIGURATION MANAGEMENT SYSTEM, AND CENTRAL COMPUTER SYSTEM THEREFOR

(75) Inventor: Michael Jensen, Viborg (DK)

(73) Assignee: Siemens Aktiengesellschaft, München (DE)

( * ) Notice: Subject to any disclaimer, the term of this patent is extended or adjusted under 35 U.S.C. 154(b) by 235 days.

(21) Appl. No.: 12/937,382

(22) PCT Filed: Jun. 8, 2009

(86) PCT No.: PCT/EP2009/057044
§ 371 (c)(1),
(2), (4) Date: Oct. 12, 2010

(87) PCT Pub. No.: WO2010/000570
PCT Pub. Date: Jan. 7, 2010

(65) Prior Publication Data
US 2011/0035068 A1 Feb. 10, 2011

(30) Foreign Application Priority Data
Jul. 2, 2008 (EP) ..................................... 08011961

(51) Int. Cl.
*G06F 19/00* (2011.01)
(52) U.S. Cl.
USPC ......................................... 700/286; 702/184
(58) Field of Classification Search
USPC ........... 700/286, 295; 702/184, 187; 290/44, 290/55
See application file for complete search history.

(56) References Cited

U.S. PATENT DOCUMENTS

| | | | |
|---|---|---|---|
| 4,534,216 A * | 8/1985 | Fasano et al. | 73/147 |
| 6,035,423 A | 3/2000 | Hodges et al. | |
| 6,975,925 B1 | 12/2005 | Barnes et al. | |
| 7,013,203 B2 * | 3/2006 | Moore et al. | 700/286 |
| 7,013,230 B2 * | 3/2006 | Sekino | 702/117 |
| 7,099,800 B2 * | 8/2006 | Henriksen et al. | 702/187 |
| 7,318,154 B2 * | 1/2008 | Tehee, Jr. | 713/155 |
| 7,895,016 B2 * | 2/2011 | Vittal et al. | 702/184 |
| 7,960,850 B2 * | 6/2011 | Rasmussen | 290/44 |
| 2002/0029097 A1 * | 3/2002 | Pionzio et al. | 700/286 |
| 2004/0151578 A1 * | 8/2004 | Wobben | 415/4.1 |
| 2004/0230377 A1 * | 11/2004 | Ghosh et al. | 702/3 |
| 2005/0090937 A1 * | 4/2005 | Moore et al. | 700/286 |
| 2005/0107989 A1 | 5/2005 | Henriksen et al. | |

FOREIGN PATENT DOCUMENTS

| | | |
|---|---|---|
| EP | 1490741 B1 | 12/2004 |
| EP | 1 519 040 A1 | 3/2005 |
| EP | 1 571 746 A1 | 9/2005 |
| EP | 1 672 778 A2 | 6/2006 |
| JP | 2006170208 A | 6/2006 |

\* cited by examiner

*Primary Examiner* — Kidest Bahta

(57) ABSTRACT

A wind turbine configuration management system, a central computer system and a method is provided. The configuration management system includes a central computer system and a wind turbine control system controlling a wind turbine. The central computer system is coupled to the wind turbine control system over a communication network. A processing unit of the central computer is configured to periodically request configuration data from the wind turbine control system, receive configuration data from the wind turbine control system and to compare the received configuration data to a stored data.

20 Claims, 1 Drawing Sheet

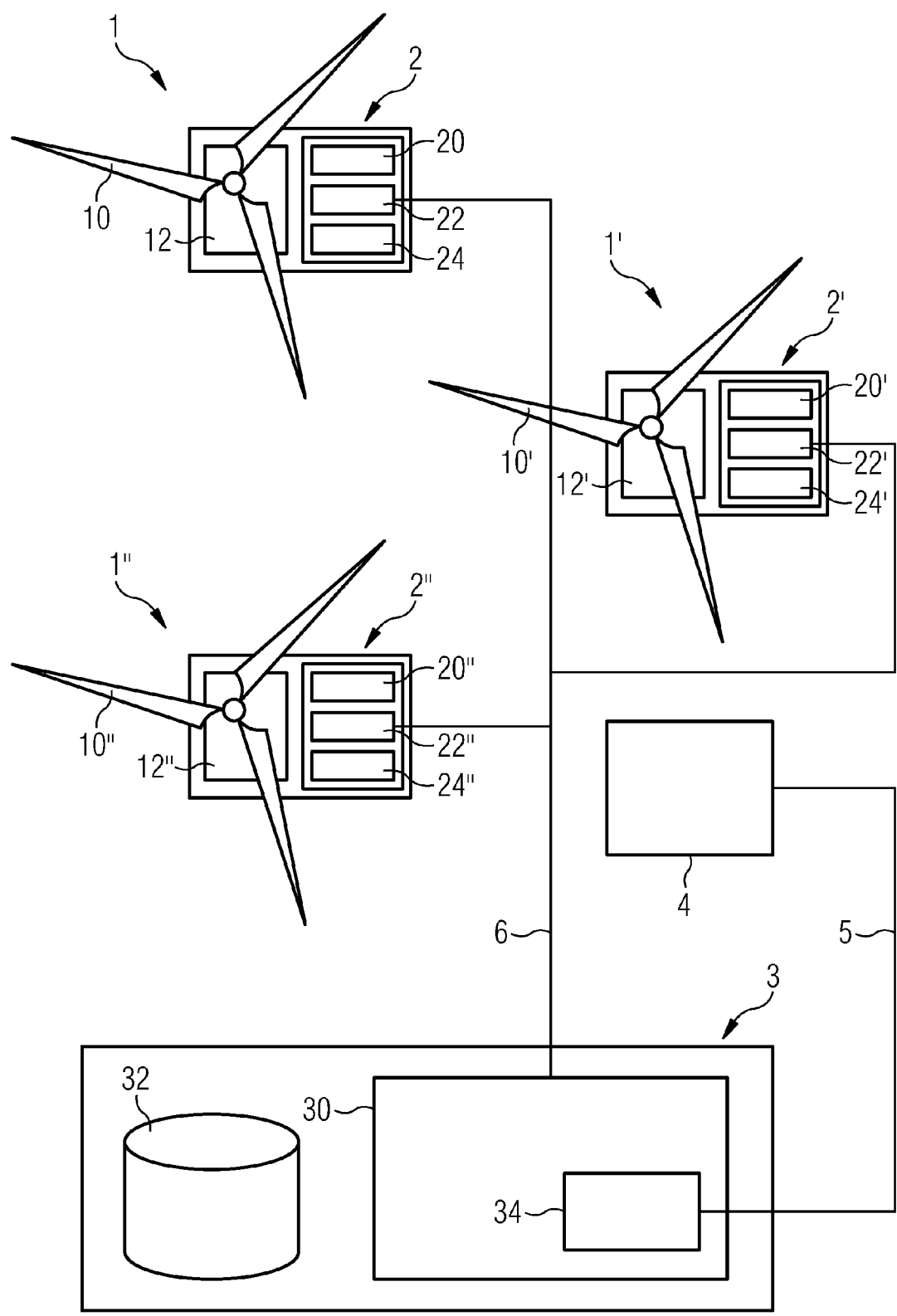

WIND TURBINE CONFIGURATION MANAGEMENT SYSTEM, AND CENTRAL COMPUTER SYSTEM THEREFOR

CROSS REFERENCE TO RELATED APPLICATIONS

This application is the US National Stage of International Application No. PCT/EP2009/057044, filed Jun. 8, 2009 and claims the benefit thereof. The International Application claims the benefits of European application No. 08011961.3 DE filed Jul. 2, 2008. All of the applications are incorporated by reference herein in their entirety.

FIELD OF INVENTION

This invention relates to a wind turbine configuration management system, comprising a central computer system having a processing unit, and at least one wind turbine control system controlling a wind turbine, wherein the wind turbine control system is coupled to the central computer system over a communication network, and wherein further the processing unit is configured to receive configuration data from the wind turbine control system, and a central computer system therefor.

BACKGROUND OF INVENTION

Wind turbine systems of the state of the art are usually controlled by on-board wind turbine control systems that comprise software and hardware components. When operating a large number of wind turbines, maintaining an individual software component (computer program) for each of the wind turbines produces substantial technical effort and is a potential source of error.

In order to avoid such a maintaining of a plurality of individual computer programs for the wind turbines, it is known to use the same computer program on each of the wind turbines, and configure the computer program individually for each wind turbine so that program execution takes place differently on the different wind turbines. Thus, only one computer program needs to be maintained, and the technical effort is substantially reduced.

Typically, each wind turbine must then be provided with a file of configuration data describing the type of the wind turbine to which the configuration file and computer program belongs, and all of the constituent parts of the wind turbine.

However, in order to establish that the wind turbines are always correctly controlled and monitored by the on-board wind turbine control system, the configuration file must always contain correct and sufficient information about the wind turbine configuration.

In practice, the contents of such configuration files can accidentally be modified during service of the turbine.

US patent application publications US 2005/0090937 A1 and US 2002/0029097 A1 propose systems in which the configuration of a wind farm and its turbines is stored on a computer system that is local to the wind farm. However, these systems do not provide means for ensuring that the stored configuration is valid. U.S. Pat. No. 6,035,423 describes a method for updating antivirus signature files on a plurality of client computers.

SUMMARY OF INVENTION

Thus it is an object of present invention to provide a system that prevents malfunction of wind turbine control due to corrupt or invalid configuration data.

This object is achieved by the subject-matter of the claims.

The invention proposes a wind turbine configuration management system, comprising a central computer system having a processing unit, and at least one wind turbine control system controlling a wind turbine, wherein the wind turbine control system is coupled to the central computer system over a communication network, and wherein further the processing unit is configured to receive configuration data from the wind turbine control system, characterized in that the central computer system comprises a memory comprising configuration reference data for the wind turbine;

the processing unit is configured to periodically request current configuration data from the wind turbine control system over the network;

the processing unit is further configured to compare the current configuration data to the configuration reference data.

By having a memory comprising configuration reference data, the central computer system can locally access the configuration data of each of the wind turbines that are coupled to the central computer system. Thus, the configuration data files stored in the central computer system can serve as configuration reference data which remains unchanged even if the configuration data in one or more of the wind turbines is accidentally modified during service of the wind turbine.

By having the processing unit being configured to periodically request current configuration data from the wind turbine control system, or a plurality thereof in different wind turbines, the status is periodically monitored during wind turbine operation. By such periodical requesting current configuration data by the central computer system, transmitting current configuration data from each of the wind turbine control systems to the central computer system, and thus receiving of the current configuration data of the various wind turbine control systems, changes in the configuration files are automatically communicated to the central computer system.

By comparing the current configuration data thus acquired to the configuration reference data stored in the memory or database for each of the wind turbine control systems coupled to the central computer system, differences between the current configuration data and the reference configuration data can be instantaneously detected. If a configuration file or set of configuration data has been accidentally manipulated during maintenance operations at the remote wind turbine site, the discrepancy between the configuration file thus manipulated and the reference configuration file stored in the central computer system is detected.

The invention can be embodied as provided in the claims.

Embodiments of the invention may be characterized in that the processing unit is configured to generate an alarm on the condition that the current configuration data do not match the configuration reference data. Thus, an operator may be notified to cross-check the finding automatically generated by the system, and to correct the remote configuration data at the wind turbine control system. Alternatively, or at the same time, the alarm thus generated can further be processed automatically by the system in embodiments where the processing unit is further configured to transmit the configuration reference data to the wind turbine control system on the condition of the current configuration data not matching the configuration reference data for the wind turbine.

In embodiments, the configuration data can be descriptive of the configuration of the wind turbine. For example, the configuration data, which can be embodied in a configuration file, can contain information concerning the type of generator with which the turbine is equipped, and whether or not a particular sensor is installed and active. Further, the configuration data may comprise type information and/or version information of software components installed in the wind turbine. Likewise, the configuration data may comprise type information and/or version information about electronic components and/or structural components of the wind turbine.

Embodiments of the wind turbine configuration management system may be characterized in that the wind turbine control system is configured to maintain the configuration data locally in a data file. Also in such an embodiment, the processing unit of the central computer system may be configured to transmit the reference configuration data in a file format that matches the file format of the data file in the wind turbine control system. Thus, the invalid configuration data locally stored in the wind turbine control system can easily be replaced by the version of the data stored in the database of the central computer system.

Embodiments may further be characterized in that the wind turbine control system is configured to collect the configuration data upon receiving a request by the central computer system and send it to the central computer system.

Further, in embodiments, the processing unit may be configured to provide a remote user interface for maintenance of the wind turbine. Such a remote user interface may be web-based, using applications, scripting languages, and markup languages used in the World Wide Web, such as HTML.

In embodiments of the invention, the wind turbine control system may comprise a software component which is parameterized by the configuration data so as to individualise the behaviour of a standard software component common to all wind turbines of the same type.

The invention provides a central computer system for a wind turbine configuration management system, comprising a processing unit configured to receive configuration data from a wind turbine control system of a wind turbine, characterized in that it comprises a memory comprising configuration reference data for the wind turbine;

the processing unit is configured to periodically request current configuration data from the wind turbine control system;

the processing unit is further configured to compare the current configuration data to the configuration reference data.

As the person skilled in the art will acknowledge, the central computer system can be embodied as explained for the central computer system that is part of the wind turbine configuration management system above, and/or as explained in the detailed embodiment.

BRIEF DESCRIPTION OF THE DRAWINGS

The invention will be described in more details below, referring to the sole FIGURE, which shows a schematic overview of an embodiment of the wind turbine configuration management system.

DETAILED DESCRIPTION OF INVENTION

Wind turbines 1, 1', and 1" form a wind turbine park which can comprise still further wind turbines presently not shown.

Each of wind turbines 1, 1', and 1" comprise a rotor 10 (10', 10", respectively) and structural components 12 (12', 12") which may comprise generators, bearings, sensors, actors, etc. which all are illustrated by the box denoted by the reference sign 12.

Wind turbines 1, 1', and 1" further each comprise a wind turbine control system 2 (2', 2", respectively). Each of the wind turbine control systems in turn comprise a processing unit 20 (20', 20"), a configuration data file 22 (22', 22"), and a software component 24 (24', 24") being run by the processor or processing unit. While the software components 24, 24', and 24" are identical to each other, configuration data files 22, 22', and 22" differ from each other.

Each of the configuration data files 22, 22', and 22" is individually adapted for the particular configuration of the wind turbine in which it is comprised. The configuration data file may comprise information concerning the type of generator with which the turbine is equipped, and whether or not a particular sensor is installed and active. By this and similar information, the configuration data file describes the type of wind turbine with all its constituent parts. Thus, the software component, or computer program, 24 (24', 24") is configured to be executed in a different way on each of the wind turbines. Thus, only one computer program needs to be maintained and, at the same time, the behaviour of the computer program is adapted to the particular characteristics of the wind turbine in which the computer program, or software component, belongs to.

Wind turbine control systems 2, 2', and 2" each are connected to the processing unit 30 of central computer system 3 over communication network 6. Processing unit 30 in turn comprises an HTTP server (Hypertext Transfer Protocol) in order to provide a web-based remote user interface based on HTML (Hypertext Markup Language). The remote user interface provided by the processing unit 30 through its HTTP server 34 can be accessed by World Wide Web terminal 4 over the internet 5. World Wide Web terminal 4 may be embodied by a standard PC or a mobile handheld device running a World Wide Web client such as an HTML browser.

Central computer system 3 further comprises a database 32. In database 32, a plurality of configuration reference data files is stored such that for each of wind turbines 1, 1', and 1", a validated copy of the configuration data files 22, 22', 22" is stored as a reference in database 32.

Processing unit 30 is configured to periodically request current configuration data from the wind turbine control systems 2, 2', 2" over network 6. Processing units 20, 20', and 20" are each configured to receive the request and send the current configuration data file 22, 22', and 22", respectively, to the processing unit 30 of central computer system 3 over the communication network 6.

Processing unit 30 is further configured to receive the current configuration data files 22, 22', 22" and compare them with the respective reference copies in database 32, mainly with the configuration reference data files corresponding to the respective wind turbines 1, 1', 1", or the wind turbine control systems 2, 2', 2", respectively.

Processing unit 30 is further configured to generate an alarm on the condition of the current configuration data file not matching the configuration reference data file for any of the wind turbines of the wind turbine park. This alarm is communicated to an operator over a web interface provided by web server (HTTP server) 34, internet 5, and web terminal 4.

For the purposes of this example, and without limitation for the scope of the present invention, it is assumed that a mismatch between the current configuration data file 22 in wind turbine control system 2 of wind turbine 1 and the configuration reference data file for wind turbine control system 2 of wind turbine 1 in database 32 has been detected.

The web-based remote user interface then communicates the alarm generated by processing unit 30 to an operator, indicating that the configuration data file 22 in wind turbine 1 is invalid. The web-based remote user interface then allows an operator to instruct the processing unit 30 to transmit the configuration reference data file corresponding to data file 22, or corresponding to wind turbine control system 2, respectively, to the wind turbine control system 2. The processing unit 20 of wind turbine control system 2 is configured to receive the configuration data file thus transmitted by the processing unit 30 and to replace the invalid current configuration data file 22 with the transmitted, valid configuration data file received from the processing unit 30 of the central computing system.

In order to simplify data comparison in the processing unit 30 and further to simplify the process of replacing invalid configuration data files with the configuration reference data files as described above, the files 22, 22', 22" are of the same data format as the configuration reference data files stored in database 32.

The present system automatically supervises the configuration of several wind turbines of a wind turbine park, wherein the number of turbines under supervision is generally unlimited. A principle component of the system is a central computer system at a central facility which is capable of remotely communicating with all the wind turbines, or the wind turbine control systems, under supervision. Such wind turbines or wind turbine parks can be located anywhere in the world and can be managed from one central facility.

The desired configuration for every wind turbine is stored in a database maintained at the central facility. Once every prespecified period of time, for instance 24 hours, the central computing system at the facility retrieves current configuration data from each of the wind turbines and compares this data to the stored configuration data in the database. If a discrepancy is detected, the server alerts service personal and allows the service personal to take appropriate action. In this way, a new configuration file can be sent to a wind turbine to replace a configuration file at the turbine that has become invalid.

The present system provides user interaction over a web-based remote user interface via the internet. In particular, the results of the comparison between desired and actual configuration data can be displayed in graphical form on a web site.

By regularly monitoring the configuration of the software of all wind turbines and comparing the actual, current configuration with a desired configuration stored at the central facility, the present system ensures that accidental changes to the configuration are detected so that every wind turbine is operated as desired.

The invention claimed is:

1. A wind turbine configuration management system, comprising:
a wind turbine control system which controls a wind turbine; and
a central computer system which is coupled to the wind turbine control system over a communication network, the central computer system includes:
a memory comprising configuration reference data for the wind turbine, and
a processing unit configured to:
periodically request current configuration data from the wind turbine control system over the network,
receive the current configuration data from the wind turbine control system in response to the periodic request, and
compare the received current configuration data to the configuration reference data.

2. The wind turbine configuration management system according to claim 1, wherein the processing unit is configured to generate an alarm on the condition of the received current configuration data not matching the configuration reference data.

3. The wind turbine configuration management system according to claim 1, wherein the configuration data is descriptive of the configuration of the wind turbine.

4. The wind turbine configuration management system according to claim 3, wherein the configuration data comprises type information and/or version information of software components installed in the wind turbine.

5. The wind turbine configuration management system according to claim 3, wherein the configuration data comprises type information and/or version information about electronic components and/or structural components of the wind turbine.

6. The wind turbine configuration management system according to claim 1, wherein the wind turbine control system is configured to maintain the configuration data locally in a data file.

7. The wind turbine configuration management system according to claim 6, wherein the processing unit is configured to transmit the reference configuration data to the wind turbine control system.

8. The wind turbine configuration management system according to claim 4, wherein the processing unit is configured to transmit the reference configuration data in a file format matching the data file in the wind turbine control system.

9. The wind turbine configuration management system according to claim 1, wherein the wind turbine control system is configured to collect the configuration data upon receiving the request from the central computer system and to send the configuration data to the central computer system.

10. The wind turbine configuration management system according to claim 1, wherein the processing unit is configured to provide a remote user interface for maintenance of the wind turbine.

11. The wind turbine configuration management system according to claim 10, wherein the remote user interface is web-based.

12. The wind turbine configuration management system according to claim 1, wherein the wind turbine control system comprises a software component which is parameterized by the configuration data.

13. A central computer system for a wind turbine configuration management system, comprising:
a memory comprising configuration reference data for the wind turbine, and
a processing unit configured to:
periodically request current configuration data from the wind turbine control system over the network,
receive the current configuration data from the wind turbine control system in response to the periodic request, and
compare the received current configuration data to the configuration reference data,
wherein the central computer system is coupled to the wind turbine control system over a communication network.

14. A method for configuring a wind turbine by a central computer system, comprising:
storing a configuration reference data in a memory of the central computer system;
periodically request current configuration data from a control system of the wind turbine over a network;

receiving the current configuration data from the control system in response to the periodic request;

comparing the received current configuration data to a stored configuration reference data stored in a memory of the central computer system; and transmitting the stored configuration reference data to the wind turbine based when the comparison indicates the received current configuration data does not match the stored configuration reference data.

15. The method according to claim 14, further comprising generating an alarm when the comparison indicates the received current configuration data does not match the stored configuration reference data.

16. The method according to claim 14, further wherein the configuration data is descriptive of the configuration of the wind turbine.

17. The method according to claim 16, wherein the configuration data comprises type information and/or version information of software components installed in the wind turbine.

18. The method according to claim 16, wherein the configuration data comprises type information and/or version information about electronic components and/or structural components of the wind turbine.

19. The method according to claim 14, wherein the stored configuration reference data is transmitted to the wind turbine in a file format matching a data file in the wind turbine control system.

20. The method according to claim 14, wherein the wind turbine comprises a software component which is parameterized by the configuration data.

\* \* \* \* \*